C. C. GRAY.
CONVEYING MECHANISM.
APPLICATION FILED MAY 3, 1918.
1,292,761.
Patented Jan. 28, 1919.
2 SHEETS—SHEET 1.
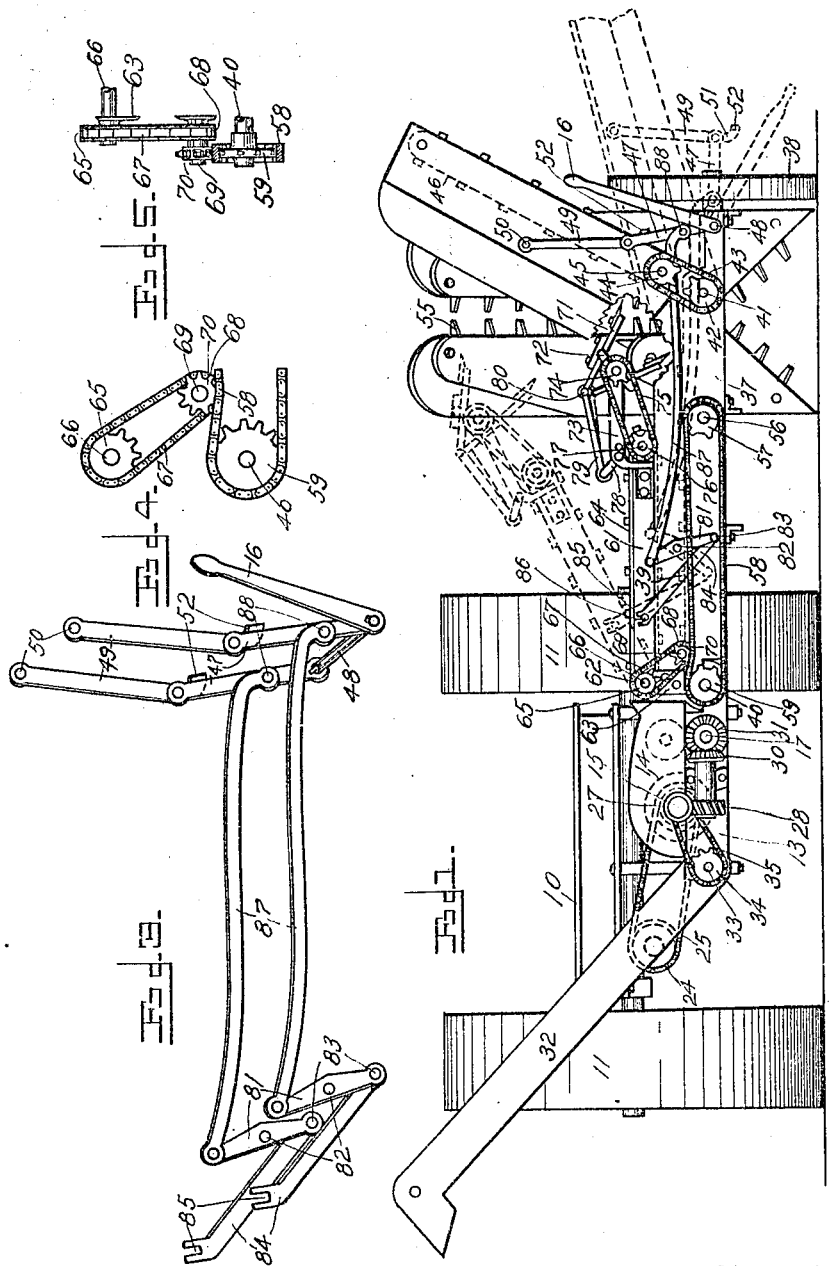
Inventor
Carl C. Gray.
By Alfred T. Gage
Attorney

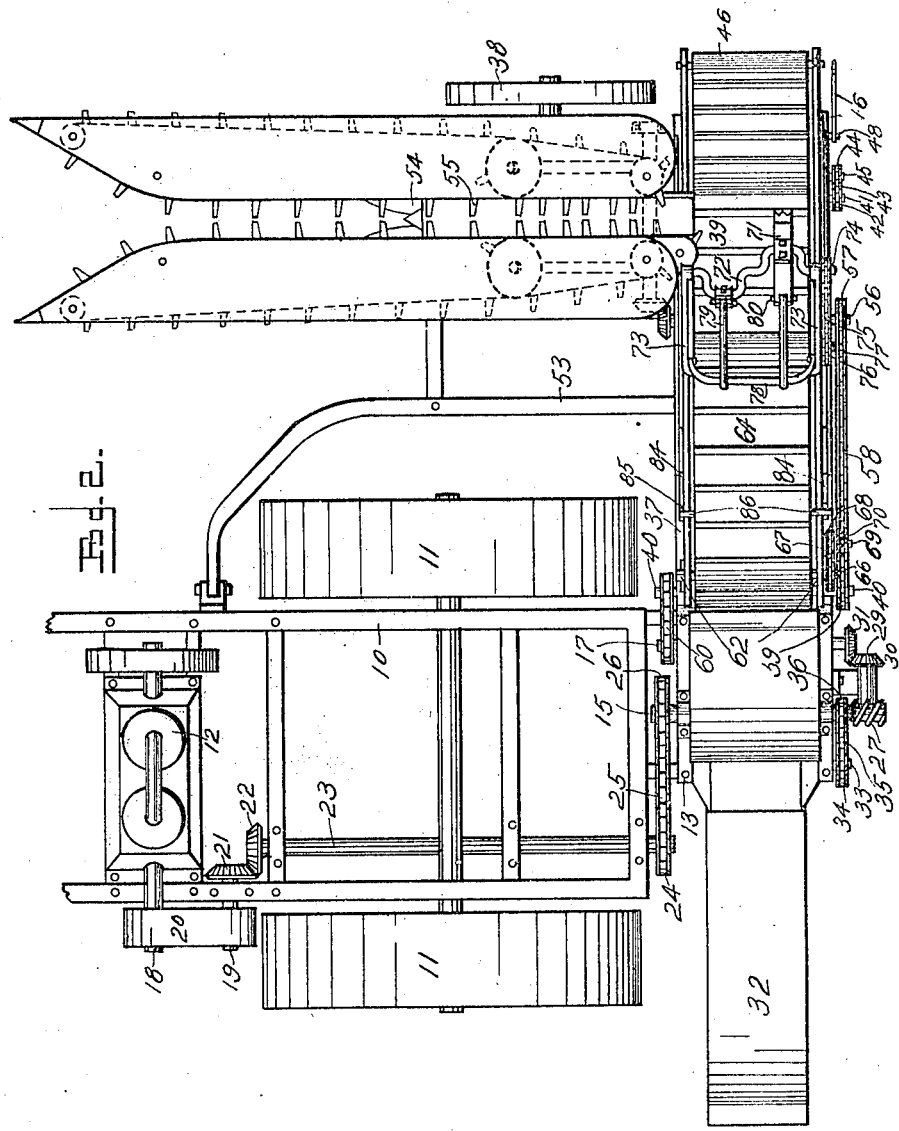

UNITED STATES PATENT OFFICE.

CARL C. GRAY, OF WAYNESFIELD, OHIO.

CONVEYING MECHANISM.

1,292,761. Specification of Letters Patent. Patented Jan. 28, 1919.

Application filed May 3, 1918. Serial No. 232,241.

*To all whom it may concern:*

Be it known that I, CARL C. GRAY, a citizen of the United States, residing at Waynesfield, in the county of Auglaize and State of Ohio, have invented certain new and useful Improvements in Conveying Mechanism, of which the following is a specification.

This invention relates to a conveying mechanism, and particularly to a construction designed to act as a convertible mechanical or hand fed conveyer for conducting material in proper position to an ensilage or other cutter.

The invention has for an object to provide a novel and improved construction comprising a main conveyer, a feed table conveyer pivotally mounted at the receiving end thereof for adjustment in a vertical plane, a shiftable feeding device disposed above the main conveyer, and connecting means whereby the feeding device and table conveyer are simultaneously shifted so that the mechanism is readily convertible for use either with a harvester or mechanical device feeding to the main conveyer, or independent of the harvester for hand feeding when the harvester is not in use.

A further object of the invention is to produce an improved construction wherein movable packing members are disposed above the receiving end of the main conveyer to force material into contact with the upper surface thereof and cause it to be fed beneath the superposed feeding device, and when used in connection with the inclined table conveyer these packing members cause the stalk butts to be drawn forward by the main conveyer while the stalk tops fall upon and are fed by the table conveyer.

Another object of the invention is to present a novel construction and arrangement of gearing for driving the several parts, and of the connections for simultaneously shifting the table conveyer and feeding device superposed above the main conveyer and carrying the packing members.

Other and further objects and advantages of the invention will be hereinafter set forth and the novel features thereof defined by the appended claims.

In the drawings—

Figure 1 is an end elevation of the invention;

Fig. 2 is a top plan thereof;

Fig. 3 is an enlarged detail perspective of the shifting connections; Fig. 4 is a detail elevation of driving means for the feeder; and Fig. 5 is an edge view thereof.

Like numerals of references indicate like parts in the several figures of the drawings.

The numeral 10 indicates the tractor or other supporting frame which may be of any desired construction and provided with the usual tractor wheels 11 and any preferred form of motor 12. The tractor frame has secured at its rear a cutter frame 13 adapted to support any desired form of ensilage cutter or other device. The form thereof shown comprises the cutting cylinder 14 carried by shaft 15 mounted in the frame 13 and a coöperating feed roller carried by shaft 17 similarly mounted.

These parts may be driven by any preferred connections, for instance the motor shaft 18 is connected to a counter shaft 19 by a belt 20. The shaft 19 is provided with a bevel gear 21 meshing with a similar gear 22 on shaft 23. The latter is provided with a sprocket 24 connected by chain 25 with a sprocket 26 on the cutter shaft 15. The connection from this shaft to the feed roll shaft 17 may be of any desired character, such as the worm gear 27 on shaft 15 meshing with a worm wheel 28 secured on the drive shaft 29 which also carries at its opposite end a bevel gear 30 meshing with a coöperating gear 31 on shaft 17.

The tractor frame also supports a main delivery conveyer 32 driven by shaft 33 carrying a sprocket 34 from which a chain 35 extends to a sprocket 36 on the cutter shaft 15. A conveyer frame 37 is mounted upon the frame 13 in any desired manner and may be supported at its outer end by a traction wheel 38. The frame 37 has mounted thereon the main conveyer 39 which may comprise a belt extending over and driven by the shaft 40 at one end and by its contact driving the shaft 41 over which it passes at the opposite end.

At the outer or receiving end of the conveyer belt an inclined feed table conveyer is pivotally mounted for adjustment in a vertical plane, and when in the vertical position shown by full lines in Fig. 1, is adapted to feed downward toward the main conveyer material delivered from a harvester or other mechanism at the receiving end of the main conveyer. When shifted to the substantially horizontal dotted line position forms a feed table independent of said harvester when the latter is at rest and the parts used solely as a hand fed conveyer. The feed table conveyer may be driven from the shaft 41 by means of a sprocket 42 thereon from which a chain 43 extends to a sprocket 44 on the lower driving shaft 45 for the belt 46 which forms the feed table conveyer.

For the purpose of supporting and shifting the feed table conveyer a lever 47 is pivotally mounted by shaft 48 upon a fixed part and has pivoted thereto a link 49 which is also pivoted to the frame of the table conveyer at 50. This forms a jointed connection and the travel thereof when in vertical position is limited by an extension 51 from the lower end of the link 49 having a lateral stop 52 to engage the lever 47, Fig. 1. These parts and the shifting members to be hereinafter described may be duplicated at opposite sides of the conveyer and the shaft 48 provided with a shifting lever 16.

The conveyer frame is provided with an extension 53 adapted to support any desired form of harvesting mechanism 54 the gathering chains 55 of which are arranged to deliver stalks or other material at the junction of the main and feed table conveyers. These chains may be driven in any desired manner, for instance by a cross shaft 56 provided with a sprocket 57 from which a chain 58 extends to the sprocket 59 carried by the driving shaft 40 of the main conveyer which is driven from the feed roll shaft 17 by a sprocket and chain connection 60.

Disposed above a portion of the main conveyer is a feeding device comprising a frame 61 pivotally mounted at 62 upon a fixed support 63 and carrying a feed belt 64. This belt is driven by a sprocket 65 upon the shaft 66 at its pivoted end from which a chain 67 extends to a sprocket 68 carried by a stub shaft 69 mounted upon the main conveyer frame. This stub shaft also carries a driving sprocket 70 meshing with the links of the chain 58 and thus secures the proper direction of drive to cause the lower face of the feed belt to travel in the same direction as the upper face of the main conveyer.

At the receiving or free end of the feeding device movable packing members are mounted and these may comprise the packing forks 71 mounted upon a crank shaft 72 carried by the supporting arms 73 extended from the frame of the feeding device. The crank shaft is driven by a sprocket 74 from which a chain 75 extends to a sprocket 76 carried by the shaft 77 at the outer end of the feed belt 64 and driven by contact therewith. To permit proper movement of the packing forks 71 they are each connected with a bar 78, secured in the arms 73, by means of links 79 pivoted to the upper free ends 80 of the forks and said bar.

When the conveyer is to be fed by hand the feed belt and packing forks are raised upward from the main conveyer simultaneously with the lowering of the feed table conveyer, as shown by dotted lines in Fig. 1. This may be effected by any preferred connections, such as the lever 81 pivoted at 82 to a fixed part intermediate its ends. From a pivotal connection 83 with the lower end of this lever an arm 84 extends upward and is provided with a slotted free end 85 embracing a pivot 86 mounted upon the frame 61 of the feeding device. The upper end of the lever 81 is pivotally connected to a rod 87, extending to a pivotal connection 88 with the lever 47. A simultaneous shifting of the parts into proper operative position is thus secured and the mechanism readily converted from a harvester fed position to one adapted for hand feeding upon the lowered table conveyer.

In the operation of the invention, when the parts are in the full line position shown in Fig. 1, the stalks or other materials are cut by the harvester and carried backward by the gathering chains until their butts or lower ends rest upon the main conveyer by which they are drawn in its direction of travel toward the cutter causing the stalk tops to fall with their heads upon the inclined feed table conveyer by which they are fed in the same direction. This action is supplemented by the feeding movement of the packing forks which hold the material upon the main conveyer and also force it beneath the superposed feeding belt so that it is fed to the cutter in a compact and proper position to secure the most efficient cutting action. When shifted into the dotted line position of Fig. 1 to convert the mechanism for hand feeding, the feed belt and packers are lifted from their operative position relative to the main conveyer and the feed table conveyer lowered into a substantially horizontal position. The feed is then effected by hand in the proper position upon the table conveyer and the material fed thereby to the main conveyer. The loose connection of the feed belt with its lifting lever permits the belt to yield under different conditions of feed without affecting the shifting connections and also to be swung entirely to one side upon its pivot. The construction of the driving and shifting connections herein shown provides very efficient means for the proper timing of the several driven parts and the simultaneous shifting of the elements to convert the mechanism for either mechanical or hand fed operation by the simple actuation of the shifting lever.

The parts of this mechanism have been hereinbefore described as mounted upon a tractor, but may be mounted upon any suitable form of fixed or movable support and driven from any preferred source of power. Any desired construction of harvester, conveyers, and ensilage cutter may be used, as the invention herein disclosed relates to the novel construction of the conveying mechanism and its coöperative relation for either mechanical or hand feeding purposes.

What I claim is:

1. A main conveyer, a feed table conveyer pivotally mounted at the receiving end thereof for adjustment in a vertical plane, a shiftable feeding device disposed above the main conveyer, and connecting means whereby the feeding device and table conveyer are simultaneously shifted.

2. A main conveyer, a feed table conveyer pivotally mounted at the receiving end thereof for adjustment in a vertical plane, a shiftable feeding device disposed above the main conveyer, and connecting means whereby the feeding device is moved out of operative relation parallel with the main conveyer as the table conveyer is lowered.

3. A main conveyer, a feed table conveyer pivotally mounted at the receiving end thereof for adjustment in a vertical plane, a pivoted feeding device disposed above the main conveyer, and a connection from said device to the table conveyer whereby the former is moved toward or from the main conveyer during the adjustment of the table conveyer in a vertical plane.

4. A main conveyer, a feed table conveyer pivotally mounted at the receiving end thereof for adjustment in a vertical plane, a pivoted feeding device disposed above the main conveyer for adjustment in a vertical plane, and means connecting said device and table conveyer by which a movement of the free end of one member will be transmitted to the other.

5. A main conveyer, a feed table conveyer pivotally mounted at the receiving end thereof for adjustment in a vertical plane, a pivoted feeding device disposed above the main conveyer for adjustment in a vertical plane, and means connecting said device and table conveyer for simultaneous movement while permitting independent vertical movement of the feeding device.

6. A main conveyer, a feed table conveyer pivotally mounted at the receiving end thereof for adjustment in a vertical plane, a shiftable feeding device disposed above the main conveyer, a packing member disposed at the receiving end of said device, and means whereby said feeding device, packing member, and table conveyer, are simultaneously shifted.

7. A horizontally disposed main conveyer, a vertically inclined feed table conveyer mounted to deliver at the receiving end thereof, a feeding device disposed above the main conveyer, and a packing member disposed at the junction of the main and table conveyers to force material toward the main conveyer and said feeding device.

8. A main conveyer, a feeding device disposed above and parallel to the main conveyer, means for adjusting said device toward and from the main conveyer and having a free connection to permit independent movement of the device, and a packing member carried by said device at its receiving end.

9. A main conveyer, an inclined feed table conveyer mounted at the receiving end thereof, a feeding device disposed above the main conveyer, a packing member disposed at the junction of the main and table conveyers, and mechanical means for delivering material at said junction.

10. A main conveyer, a feed table conveyer mounted at the receiving end thereof, a feed belt disposed above and parallel to the main conveyer, a packing member disposed at the junction of the main and table conveyers, and mechanical means for delivering material at said junction.

11. A main conveyer, a frame disposed above the same and pivotally mounted at one end, a feed belt carried by said frame, a pivoted lifting lever disposed beneath said frame, and an arm carried by said lever, and a free connection therewith adapted to permit an independent raising movement of the frame relative to said arm.

12. A main conveyer, a frame disposed above the same and pivotally mounted at one end, a feed belt carried by said frame, means for driving said belt located at the pivoted end of the frame, a pivoted lifting lever for said frame, an arm from said lever having a slotted free end, and a bearing pin carried by said frame and disposed in said slot.

13. A main conveyer, a frame disposed above the same and pivotally mounted at one end, a feed belt carried by said frame, means for driving said belt, a support extended from the free end of said frame, a crank shaft mounted therein, and a packing fork mounted upon said crank shaft.

14. A main conveyer, a frame disposed above the same and pivotally mounted at one end, a feed belt carried by said frame, means for driving said belt, a support extended from the free end of said frame, a crank shaft mounted therein, a packing fork pivoted upon said crank shaft, and means for driving said shaft from said belt.

15. A main conveyer, a frame disposed above the same and pivotally mounted at one end, a feed belt carried by said frame, means for driving said belt, a support extended from the free end of said frame, a crank shaft mounted therein, a packing fork pivoted upon said crank shaft, a cross bar mounted in said support, a pivoted link connecting said cross bar and the upper end of said fork, and means for driving said crank shaft from said belt.

16. A main conveyer, a feed belt disposed above the same and pivotally mounted at one end, a lifting lever connected to adjust the free end of said belt, a feed table conveyer pivotally mounted at the receiving end of the main conveyer for adjustment in a vertical plane, a lifting lever having a link connection with said table conveyer, and a connection extending from said last mentioned lever to the belt lifting lever to effect simultaneous operation thereof.

17. A main conveyer, a feed belt disposed above the same and pivotally mounted at one end, a lifting lever centrally pivoted, an arm extending from one end thereof to said belt mounting, a connecting rod extending from the opposite end of said lever, a feed table conveyer pivotally mounted at the receiving end of the main conveyer for adjustment in a vertical plane, a lifting lever therefor pivotally connected with said rod, and a connecting link pivoted to said last mentioned lever and the table conveyer mounting.

18. A main conveyer, a feed belt disposed above the same and pivotally mounted at one end, a centrally pivoted lifting lever, an arm extending from one end thereof and having a slot and pin connection with the belt mounting, a connecting rod extending from the opposite end of said lever, a feed table conveyer pivotally mounted at the receiving end of the main conveyer for adjustment in a vertical plane, a lifting lever provided with a shifting handle and pivoted to said rod, a connecting link pivoted to the last mentioned lever and the table conveyer mounting, and means carried by said link to engage the last mentioned lifting lever and limit the vertical movement of the parts.

19. A main conveyer, a driven feed table conveyer disposed at the receiving end thereof, mechanical means for delivering material at the junction of said conveyers, and packing means disposed over the main conveyer at said junction for forcing the lower portion of material so delivered into contact with the main conveyer and in the direction of its travel.

20. A main conveyer, a driven feed table conveyer disposed at the receiving end thereof, mechanical means for delivering material at the junction of said conveyers, feeding means disposed above and parallel to the main conveyer, and packing means disposed over the main conveyer at said junction to travel in a downward arc toward said main conveyer and the receiving end of said feeding means.

In testimony whereof I affix my signature in the presence of two witnesses.

CARL C. GRAY.

Witnesses:
J. BURTON WELLS,
G. R. WELLS.